United States Patent
Anders et al.

(10) Patent No.: US 6,646,057 B1
(45) Date of Patent: *Nov. 11, 2003

(54) PRODUCTION MATERIALS HAVING UNSTYRENATED POLYESTER OR VINYL ESTER RESINS

(75) Inventors: Richard M. Anders, South Bend, IN (US); Kenneth R. Anders, Lapeer, MI (US); Dale K. Becker, Random Lake, WI (US)

(73) Assignee: Composite Technology Group, Sheboygan, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,890

(22) Filed: Nov. 4, 1998

Related U.S. Application Data

(60) Provisional application No. 60/081,554, filed on Apr. 13, 1998, and provisional application No. 60/064,263, filed on Nov. 4, 1997.

(51) Int. Cl.$^7$ .......................... C08F 8/30; C08F 265/00; C08F 265/06; C08F 277/00; C08F 283/01

(52) U.S. Cl. .......................... 525/278; 525/10; 525/28; 525/193; 525/210; 525/211; 525/222; 525/303; 525/309; 525/329.5; 525/330.5; 525/332.1; 525/374; 525/384; 525/386; 525/437; 525/440; 525/445; 525/176

(58) Field of Search .......................... 525/10, 28, 176, 525/193, 210, 211, 222, 278, 303, 309, 329.5, 330.5, 332.1, 374, 384, 386, 437, 440, 445

(56) References Cited

U.S. PATENT DOCUMENTS

| | | | | |
|---|---|---|---|---|
| 3,997,627 A | * | 12/1976 | Ichimura et al. | 526/320 |
| 4,037,038 A | * | 7/1977 | Tsuchiya | 525/386 |
| 4,085,018 A | * | 4/1978 | Ariga et al. | 522/103 |
| 4,101,604 A | * | 7/1978 | Rowe | 523/513 |
| 4,320,045 A | * | 3/1982 | Owen | 523/523 |
| 4,618,632 A | * | 10/1986 | Su | 522/43 |
| 4,829,123 A | * | 5/1989 | Shigematsu et al. | 525/28 |
| 4,920,180 A | | 4/1990 | Toyoshima et al. | 525/328.9 |
| 5,498,683 A | * | 3/1996 | Kim | 526/320 |
| 5,620,751 A | * | 4/1997 | Brindoepke et al. | 427/506 |
| 5,773,531 A | | 6/1998 | Smith | 525/445 |

\* cited by examiner

*Primary Examiner*—Rabon Sergent
(74) *Attorney, Agent, or Firm*—Quarles & Brady LLP

(57) ABSTRACT

Disclosed is a nonstyrenated polyester or vinyl ester resin that is found to be nonbrittle and to have good temperature performance, relative to known nonstyrenated polyesters or vinyl esters. Also disclosed is a nonstyrenated polyester or vinyl ester urethane acrylate resin. Methods for making nonstyrenated polyester or vinyl ester resins, including urethane acrylate resins, are provided.

19 Claims, No Drawings

PRODUCTION MATERIALS HAVING UNSTYRENATED POLYESTER OR VINYL ESTER RESINS

CROSS-REFERENCE TO RELATED APPLICATIONS

This application claims priority to U.S. Provisional Application S No. 60/064,263, filed Nov. 4, 1997, and U.S. Provisional Application S No. 60/081,554 filed Apr. 13, 1998.

STATEMENT REGARDING FEDERALLY SPONSORED RESEARCH OR DEVELOPMENT

Not applicable.

BACKGROUND OF THE INVENTION

Production material resins are commonly used in the manufacture of a variety of articles including, for example, lightweight interior and exterior parts in automobiles and recreational vehicles such as boat hulls, conversion van parts, truck bed covers, automobile trim and exterior panels, snowmobiles, pull behind campers, motorcycles, and bathtubs. These items are most commonly made from unsaturated polyester resins, which are manufactured and reduced with a solvent monomer containing styrene and other derivatives of styrenated monomers, together with vinyl toluene or methyl methacrylate, to reduce the cost and viscosity of the resin.

Styrene, vinyl toluene, and methyl methacrylate may pose health risks to people exposed to the fumes emitted by these compounds. These materials are also highly flammable, which makes handling and storage of the compounds difficult and expensive. Because of the health hazards associated with exposure to these compounds, these materials are regulated by the Environmental Protection Agency. These monomers typically are included in polyesters at levels of 10% to 90% (w/w), depending on the type of process employed, and on the desired viscosity. Resins made from these materials give off high levels of volatile organic compounds (VOC's).

Growing concern about environmental, health, and safety issues associated with the use of styrenes in resins has created a demand in the material manufacture industry for nonstyrenated resins that can be used in the manufacture of light weight parts and other articles. To avoid problems associated with the use of styrene in production material resins, nonstyrenated polyester resins have been used in the manufacture of lightweight parts. However, these materials have proven to be unsatisfactory, due to excessive brittleness and poor temperature performance, as evidenced by a low heat distortion temperature (HDT).

What is needed in the art is a nonstyrenated polyester or vinyl ester resin that is suitable for use in the manufacture of light weight parts.

BRIEF SUMMARY OF THE INVENTION

The present invention provides a nonstyrenated polyester, vinyl ester, or dicyclopentadiene (DCPD) resin. In one embodiment, the resin of the present invention comprises a hydroxylated methacrylate monomer and a polymer selected from the group consisting of vinyl esters and DCPD. In a preferred embodiment, the resin comprises a urethane acrylate and a polymer selected from the group consisting of polyesters, vinyl esters, and DCPD. Preferably, the ratio of the weights of monomer and polymer in the resin is in the range of from about 1:9 to 9:1, depending on the properties desired in the resin. Preferably, the monomer is hydroxyethyl methyl methacrylate (HEMA), hydroxyethyl propyl methacrylate (HEPMA), or a hydroxyethyl urethane acrylate.

The nonstyrenated resin of the present invention is characterized by a lack of brittleness and good temperature performance. Preferably, a crosslinked, nonstyrenated polyester urethane acrylate resin has a flex modulus of at least about 250,000 psi, a flexural strength of at least about 8000 psi, and a glass transition temperature of at least about 150° F. Preferably, a crosslinked vinyl ester resin has a flex modulus of at least about 900,000 psi, a flexural strength of at least about 20,000 psi, and a glass transition temperature of at least about 450° F.

In a preferred embodiment, the resin of the present invention comprises a monomer that is provided as a urethane acrylate. The urethane acrylate used in manufacturing the resin is made by reacting an isocyanate with a methacrylate having a hydroxyl group under suitable reaction conditions well known to those skilled in the art to form a urethane acrylate. Urethane acrylate decreases brittleness in a polyester resin, and enhances impact strength in a vinyl ester resin. Accordingly, in one aspect of the present invention, there is provided a nonstyrenated thermoset resin comprising at least one urethane acrylate monomer and at least one resin selected from the group consisting of polyesters, vinyl esters, and dicyclopentadiene, and combinations thereof, wherein the ratio (w/w) of monomer to resin is between about 1:9 and 9:1 or alternatively wherein the ratio (w/w) of monomer to solid resin is about 3:7 or greater.

Another aspect of the present invention is a method for manufacturing a nonstyrenated polyester or vinyl ester resin comprising the step of reacting a polyester, vinyl ester, or DCPD polymer with a hydroxylated monomer such as HEMA or a urethane acrylate under suitable reaction conditions.

It is an object of the present invention to provide a nonstyrenated polyester, vinyl ester, or DCPD resin that is less brittle and which has a better temperature performance than nonstyrenated polyester resins known to the art.

It is another object of the present invention to provide a method for producing a nonstyrenated polyester or vinyl ester resin that is less brittle and which has a better temperature performance that nonstyrenated polyester resins known to the art.

It is an advantage of the present invention that a polyester or a vinyl ester urethane acrylate resin suitable for use in the manufacture of lightweight parts can be produced without using high levels of volatile organic compounds.

BRIEF DESCRIPTION OF THE SEVERAL VIEWS OF THE DRAWINGS

Not applicable.

DETAILED DESCRIPTION OF THE INVENTION

The present invention includes nonstyrenated polyester, vinyl ester, and DCPD resins that are characterized by lower VOC's than conventional material resins, and which can be a produced by means that are less deleterious to the environment than methods known to the art. The resins of the present invention are good quality nonstyrenated polyester and vinyl resins that are suitable for use in processes employed in the production of parts or other articles of manufacture.

The present invention also provides a method of making a polyester, vinyl ester, or DCPD resin comprising the steps of: (a) providing at least one monomer selected from the group consisting of hydroxylated methacrylate and urethane acrylate; and mixing at least one monomer of step (a) with at least one liquefied resin selected from the group consisting of an unsaturated polyester, a vinyl ester, and a DCPD resin under suitable reaction conditions. By suitable reaction conditions, it is meant that the polymers are prepared under conditions known to one of skill in the art.

A urethane acrylate for use in the production of the resin of the present invention can be prepared by reacting an isocyanate with a hydroxylated methacrylate such as HEMA or HEPMA to form a urethane acrylate under suitable conditions well-known to one of skill in the art. Urethane acrylates suitable for use in the present invention may be obtained using reaction mixtures comprising HEMA or HEPMA in the range of from about 5% to about 80% and isocyanate in the range of from about 20% to about 95%. One means of obtaining a urethane acrylate suitable for use in the present invention is detailed in the examples below. Briefly, a blocked toluenediisocyanate (TDI) or a straight diphenylmethane diisocynate (MDI) having a percent activate isocyanate groups (NCO%) in the range of from about 1% to about 25% was slowly added to HEMA under agitation. The isocyanate was added gradually over a period of time of at least one hour. The final concentrations of the isocyanate and HEMA were 40% and 60% (w/w), respectively.

The examples below demonstrate the good physical properties of tested resins of the present inventions. A polyester urethane acrylate was formed by mixing the urethane acrylate monomer (50%) with a polypropylene glycol (50%), and a vinyl resin was formed by mixing HEMA (30%) with a vinyl ester (70%) prepared as described below. Other polymers that were used to manufacture resins produced good results, although the complete physical characterization was not conducted. Tested polymers include COR60-169-669-low reactivity orthothalic, COR61-16-670-DCPD, and COR61-169-675 low reactivity DCPD (Interplastics Corporation, Minneapolis, Minn.). It is expected that other ester resins can be used in the present invention, including orthalic, isolthalic, dicyclopentadiene (DPCD), vinyl, epoxyvinyl, novolac vinyl esters, and combinations thereof.

One of skill in the art would be able to select the ratio of the monomer blend to the polyester or vinyl ester polymer employed to achieve certain desired physical properties in the finished product. Increasing the relative percentage of monomer has the effect of lowering Tg, reducing viscosity, increasing tensile properties, lowering flexural properties, and reducing reactivity. Increasing the relative percentage of the ester has the effect of has the opposite effect on these properties.

Other polymers that were tested for use in producing resins include COR60-169-669 Low Reactivity, COR61-169-670-DCPD (Mw=about 2100), and COR61-169-675-Low reactivity DCPD (MW=about 2700) were also used to prepare resins that appeared to have good properties. An increase in the molecular weight of the polyester, DCPD, or vinyl ester decreases its reactivity and produces a more flexible resin. Polymers having a molecular weight in the range of from about 500 to about 7500 are expected to produce resins having desired characteristics.

Optionally, peroxide initiators may be used in the method of the present invention to facilitate curing to obtain a product that is highly cross-linked. Examples of suitable peroxides include cumyl hydrogen peroxide, cumene hydrogen peroxide, methyl ethyl ketone peroxide, acetal acetone peroxide, tertiary butyl perbenzoate, dicumyl peroxide, benzoyl peroxide, cyclohexanol peroxide, or methyl isobutyl ketone peroxide, and combinations thereof. The resins could also be photoinitiated, or catalyzed with anhydrides (a latent epoxy catalyst), or vazo or azo compounds.

The resins produced by the method of the present invention are very versatile and can be used in a number of different processes, including hand lay up, spray chop, resin transfer molding, reaction injection molding, structural reaction injection molding, pultrusion, extrusion, filament winding, bulk molding compound, structural molding compound, cold compression molding, vacuum infusion molding, or rotomolding. These resins are able to withstand autoclaving, which allows the resins to be used for the manufacture of articles that may need to be autoclaved.

In the examples, the resins were melted by means of heat generated by the cutting action created by high shear blades when the mixer was in operation. It is envisioned that a method that achieves melting of the resins by some other means, such as increasing the temperature of the resin by means of an external heat source, could be used in making the resins of the present invention.

The following nonlimiting examples are intended to be purely illustrative.

EXAMPLE 1

Preparation of a Urethane Acrylate Prepolymer

A urethane acrylate was prepared by reacting isocyanate (40% w/w) and HEMA (60% w/w) as follows. The appropriate amounts of isocyanate (E-743 Mondour, Bayer) and HEMA (Bisomer SR, Inspec) were weighed out and held in separate vessels of a nonreactive material such as glass or stainless steel. The isocyanate was gradually added to the HEMA over a period of at least one hour, using continuous, slow agitation with a stainless mixer. Gradual addition of the isocyanate is important to prevent side reactions that can cause the HEMA to become excessively viscous and to undergo polymerization. The reaction is exothermic, and the temperature of the reaction mixture typically increases to about 105° F. After the addition of the isocyanate to the HEMA was completed, agitation was continued until the temperature of the reaction mixture decreased to a temperature of at most about. The time required for this temperature reduction depends of course on a number of factors, including the surface area to volume ratio of the reaction mixture and ambient air temperature. Allowing the urethane acrylate to stabilize or cool is important to prevent the occurrence of side reactions during the mixing of the urethane acrylate and the unsaturated polyester or vinyl ester.

EXAMPLE 2

Preparation of a Polyester Urethane Acrylate Resin

A polyester urethane acrylate resin was prepared by combining a urethane acrylate monomer and an unsaturated polyester solid resin at a ratio of 1:1 (w/w), as follows. The urethane acrylate monomer(designated HEMA/E-743) was prepared as described in Example 1 and weighed. A portion of the monomer was loaded into the reaction vessel of a mixer, such that the monomer covered the mixing blade of the mixer. The vessel and blade are made of a nonreactive material, such as 316 stainless steel. The mixer was fitted with blades designed to achieve high shear, so that the mixer will develop a cutting action to increase friction and develop heat. Suitable mixers are available from commercial suppliers such as Cowls, Meyer, or Hockmeyer.

Mixing was initiated by increasing the blade rpms to about 500. The unsaturated orthalic polyester with a molecular weight (MW) of about 3000 (COR60-169-669, Interplastics Corporation, Minneapolis, Minn.) was crushed to obtain chunks no greater than three pounds. An amount of the solid polyester to provide a resin 50% (w/w) in polyester was weighed and transferred into the mixing vessel while the mixing continued. The mixer speed may be increased in order to facilitate breakdown of the solids. During the mixing, the temperature was monitored and was found to increase to about 165° C. Melting of the batch polymer occurred at 150° F. The material was mixed until it reached a smooth, viscous, liquid state. In some cases, addition of some of the monomer at this stage may be necessary to facilitate mixing. After the material had become smooth and consistent, the remaining monomer was added by pumping it into the bottom of the vessel at a rate of about 10 gal/min to assist in the cooling of the resin and mixed with high shear mixing, which increases the temperature of the mixture, until a homogeneous mixture was obtained. A process such as high shear mixing or heating that provides a mixture with a temperature in the range of from about 120° F. to about 250° F. at this stage is suitable. After the material reached a smooth, homogenous consistency, it was allowed to cool to about 130° F. and held, or dispensed into a bulk container for cool down. The material was allowed to cool to a temperature or 90° F. or lower, preferably ambient temperature, and additional HEMA (5% of the polymer/monomer mixture) was added to reduce viscosity. Optionally, a suitable promoter to promote curing may be uniformly dispersed by agitation. Examples of suitable promoters include amines, anilines, and metals.

A sample of a polymer resin designated RTS-82, which was prepared as described above, was evaluated to determine a variety of properties important in the performance of thermosetting plastics made from these resins. The results of this analysis are shown in Table 1.

TABLE 1

PHYSICAL DATA
RTS-82, unsaturated polyester urethane acrylate resin, non styrenated Tensile

| Test Type | ASTM D638 |
|---|---|
| Mean Tensile Strength (psi) | ~12,500 |
| Mean Tensile Modulus (psi) | ~595,400 |

Flexural

| Test Type | ASTM D790 |
|---|---|
| Mean Flexural Strength (psi) | ~14,960 |
| Mean Flexural Modulus (psi) | ~606,200 |

Compressive

| Test Type | ASTM D695 |
|---|---|
| Mean Compressive Strength (psi) | ~10,150 |
| Mean Compressive Modulus (psi) | ~273,700 |

Impact

| Test Type | ASTM D256 |
|---|---|
| Mean Impact Strength (ft*lb/in) | ~16.86 |
| Water Aging | ~Pending % |
| Glass Transition Temperature | ~108.7° C./228° F. |
| Specific Gravity | 1.20 |

EXAMPLE 3
Preparation of a Vinyl Ester

A laboratory scale test preparation of a vinyl ester was prepared using the materials listed in Table 2, and scale-up was conducted using the same materials in the amounts provided in Table 3. The Dow DER331 epoxy and methacrylic acid were loaded into a water-jacketed stainless steel reactor vessel and heated to 40° C. The materials were mixed with a mixer equipped with two three-prop blades positioned approximately one inch from the bottom of the vessel. A slow stream of dry compressed air was delivered into the vortex created by the mixing action through a sparge tube at a rate of about 60 ml/min/gallon material (±30 ml/min) and mixed in the vortex. DABCO triethylene diamine (Air Products and Chemicals, Inc. Allentown, Pa.), was added and the mixture heated to about 120° C. A small sample of the mixture was removed for acid number determination. (Acid number is defined as the number of milligrams of potassium hydroxide required to neutralize one gram of resin in a methanol solution to a phenolphthalein end point). A first aliquot of hydroquinone was added to the mixture to a final concentration of about 0.03% (w/w). The mixture was held at about 120° C. for 1 hour, at which time a second aliquot was removed for acid number testing. A second addition of hydroquinone was made, the mixture was held at 120° C. for 1 hour, a third aliquot was removed for acid number testing. If after the third test the acid number was greater than 25, the mixture was maintained at 120° C. until the acid number was less than 25. The mixture was then cooled to 60° C. and HEMA was added. The viscosity if the resin was typically between about 6500 and 7500 cps. The total pilot kettle cycle time was about four hours.

TABLE 2

LAB REACTOR COOK

| Dow DER 331 | 1,200.00 |
|---|---|
| Methacrylic Acid 99% | 518.40 |
| DABCO (triethylenediamine) | 3.60 |
| Hydroquinone | 0.06 |
| Hydroquinone | 0.06 |
| Hydroquinone | 0.06 |
| HEMA (Hydroxyethyl methacrylate) | 480.00 |
| Total: | 2,202.18 grams or 4.85 pounds |

TABLE 3

PILOT KETTLE COOK

| Dow DER 331 | 24,000.00 | 54.4915% |
|---|---|---|
| Methacrylic Acid 99% | 10,368.00 | 23.5403% |
| DABCO (triethylenediamine) | 72.00 | 0.1635% |
| Hydroquinone | 1.20 | 0.0027% |
| Hydroquinone | 1.20 | 0.0027% |
| Hydroquinone | 1.20 | 0.0027% |
| HEMA (Hydroxyethyl methacrylate) | 9,600.00 | 21.7966% |
| Total: | 44,043.60 grams or 97.01 pounds | |

EXAMPLE 4
Preparation of a Vinyl Ester Urethane Acrylate

The vinyl ester monomer thus prepared was be used to prepare a vinyl ester urethane acrylate, in the same manner that the polyester urethane acrylate of Example 2 was prepared, using 30% urethane acrylate and 70% vinyl ester. The resin thus prepared is designated RGS-49-V and has the physical properties shown in Table 4.

The present invention is not limited to the exemplified embodiment, but is intended to encompass all such modifications and variations as come within the scope of the following claims.

TABLE 4

PHYSICAL DATA
RGS-49-V, vinyl ester resin, non-styrenated

Tensile

| Test Type | ASTM D638 |
|---|---|
| Mean Tensile Strength (psi) | ~14,450 |
| Mean Tensile Modulus (psi) | ~1,116,700 |

Flexural

| Test Type | ASTM D790 |
|---|---|
| Mean Flexural Strength (psi) | ~27,250 |
| Mean Flexural Modulus (psi) | ~1,200,000 |

Compressive

| Test Type | ASTM D695 |
|---|---|
| Mean Compressive Strength (psi) | ~26,510 |
| Mean Compressive Modulus (psi) | ~467,900 |

Impact

| Test Type | ASTM D256 |
|---|---|
| Mean Impact Strength (ft*lb/in) | ~16.93 |
| Water Aging | ~0.39% |
| Glass Transition Temperature | ~365° C./689° F. |
| Specific Gravity | 1.20 |

What is claimed is:

1. A nonstyrenated thermoset resin composition comprising at least one urethane methacrylate, prepared from a reaction mixture consisting essentially of a hydroxylated methacrylate and an isocyanate, at least one resin selected from the group consisting of unsaturated polyesters, unsaturated polymers of vinyl esters, and unsaturated polymers of dicyclopentadiene, and combinations thereof, and a hydroxylated methacrylate monomer.

2. The composition of claim 1, wherein the resin is an unsaturated polymer of a vinyl ester.

3. The composition of claim 1, wherein the resin is an unsaturated polyester.

4. The composition of claim 3, wherein the composition has a $T_g$ of about 150° F. or greater when crosslinked.

5. The composition of claim 3, wherein the composition has a flexural modulus of about 250,000 psi or greater or a flexural strength of about 8000 psi or greater when crosslinked.

6. The composition of claim 1, wherein the resin is an unsaturated polymer of dicyclopentadiene.

7. The composition of claim 1, wherein the hydroxylated methacrylate of the urethane methacrylate reaction mixture is selected from the group consisting of hydroxyethyl methacrylate and hydroxyethyl propyl methacrylate.

8. An article of manufacture made using the composition of claim 1.

9. A nonstyrenated thermoset resin composition comprising at least one urethane methacrylate prepared from a reaction mixture consisting essentially of a hydroxylated methacrylate and an isocyanate, and at least one resin selected from the group consisting of unsaturated polymers of vinyl esters and unsaturated polymers of dicyclopentadiene, and combinations thereof.

10. The composition of claim 9, wherein the composition has a $T_g$ of about 450° F. or greater when crosslinked.

11. The composition of claim 9, wherein the composition has a flexural modulus of about 900,000 psi or greater or a flexural strength of about 20,000 psi or greater when crosslinked.

12. The composition of claim 9 wherein the hydroxylated methacrylate is selected from the group consisting of hydroxyethyl methacrylate and hydroxyethyl propyl methacrylate.

13. The composition of claim 9, wherein the ratio (w/w) of the urethane methacrylate to the resin is between about 1:9 to 9:1.

14. The composition of claim 9, wherein the ratio (w/w) of the urethane methacrylate to the resin is about 3:7 or greater.

15. An article of manufacture made using the composition of claim 9.

16. A method for producing a nonstyrenated thermoset resin composition comprising the steps of:
    (a) combining a urethane methacrylate, prepared from a reaction mixture consisting essentially of a hydroxylated methacrylate and an isocyanate, with at least one resin selected from the group consisting of unsaturated polyesters, unsaturated polymers of a vinyl ester, and unsaturated polymers of dicyclopentadiene, and combinations thereof,
    (b) mixing the urethane methacrylate and the resin of step (a) under conditions that cause the temperature of the mixture to increase to between about 120° F. and 250° F. to form a mixture and maintaining the temperature of the mixture between about 120° F. and 250° F. for a time period;
    (c) allowing the mixture of step (b) to cool to a temperature of about 90° F. or less; and
    (d) mixing a hydroxyethyl methacrylate monomer into the mixture of step (c) in an amount sufficient to change the viscosity of the composition.

17. A method for producing a nonstyrenated thermoset resin composition comprising the steps of:
    (a) combining a urethane methacrylate prepared from a reaction mixture consisting essentially of a hydroxylated methacrylate and an isocyanate, with at least one resin selected from the group consisting of unsaturated polymers of a vinyl ester and unsaturated polymers of dicyclopentadiene, and combinations thereof, the urethane methacrylate and the resin being present in a ratio (w/w) of between about 1:9 and 9:1;
    (b) mixing the resin and the urethane methacrylate of step (a) under conditions that cause the temperature of the mixture to increase to between about 120° F. and 250° F. to form a mixture and maintaining the temperature of the mixture between about 120° F. and 250° F. for a time period; and
    (c) allowing the mixture of step (b) to cool.

18. A nonstyrenated thermoset resin composition comprising:
    a urethane methacrylate, prepared from a reaction mixture consisting essentially of two monomers, the first monomer being a hydroxylated methacrylate selected from the group consisting of hydroxyethyl methacrylate and hydroxyethyl propyl methacrylate, and the second monomer being an isocyanate;
    a resin selected from the group consisting of unsaturated polyesters, unsaturated polymers of vinyl esters, and unsaturated polymers of dicyclopentadiene, and combinations thereof; and
    a hydroxylated methacrylate monomer.

19. A nonstyrenated thermoset resin composition comprising:
    a urethane methacrylate, prepared from a reaction mixture consisting essentially of two monomers, the first monomer being a hydroxylated methacrylate selected from the group consisting of hydroxyethyl methacrylate and hydroxyethyl propyl methacrylate, and the second monomer being an isocyanate; and
    a resin selected from the group consisting of unsaturated polymers of vinyl esters and unsaturated polymers of dicyclopentadiene, and combinations thereof.

* * * * *